June 24, 1958     J. V. BLANKENBAKER     2,840,709
FREQUENCY TO DIGITAL CONVERSION
Filed July 2, 1956     2 Sheets-Sheet 1
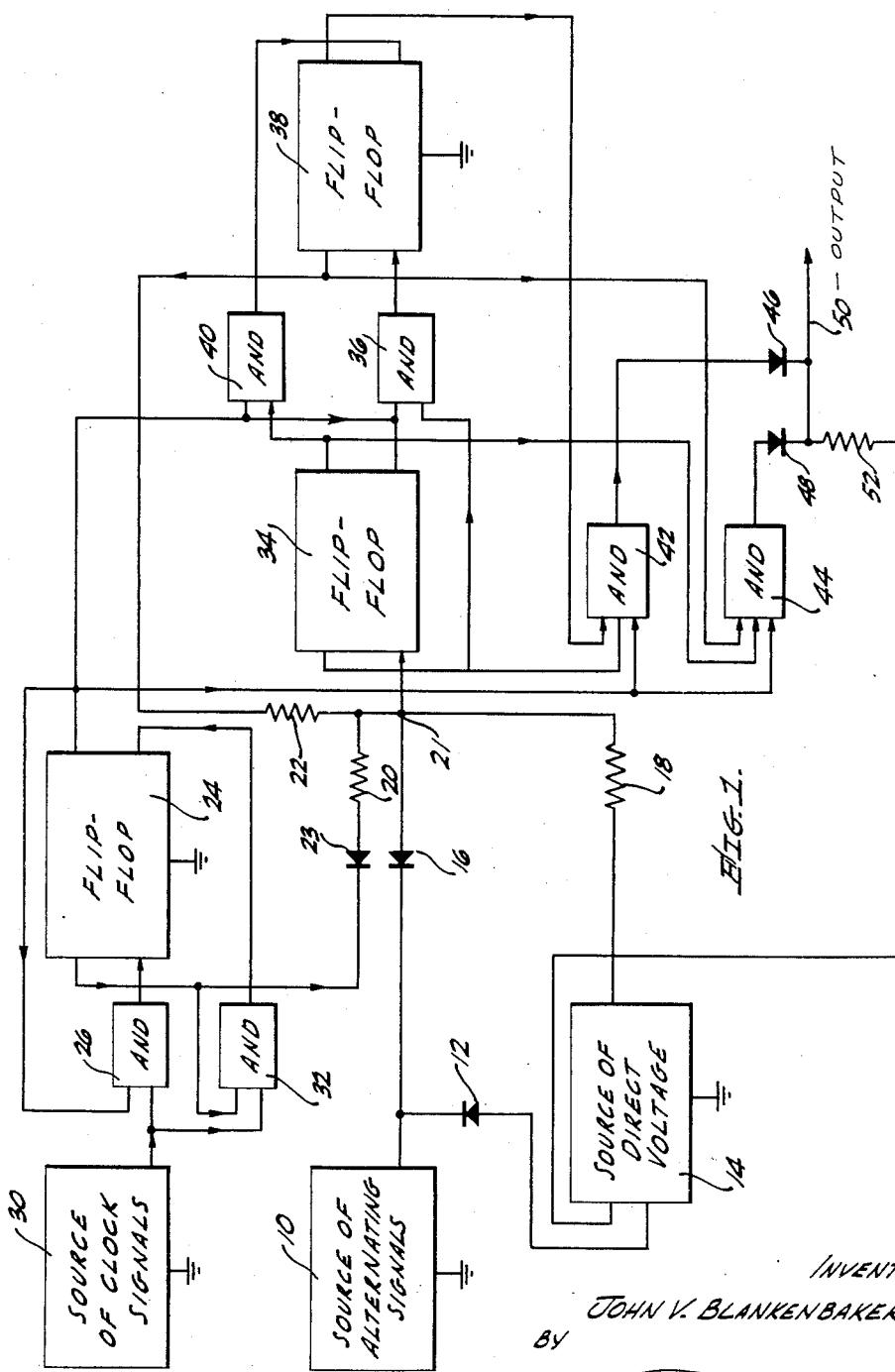
Fig. 1.
INVENTOR.
JOHN V. BLANKENBAKER,
BY
ATTORNEY.

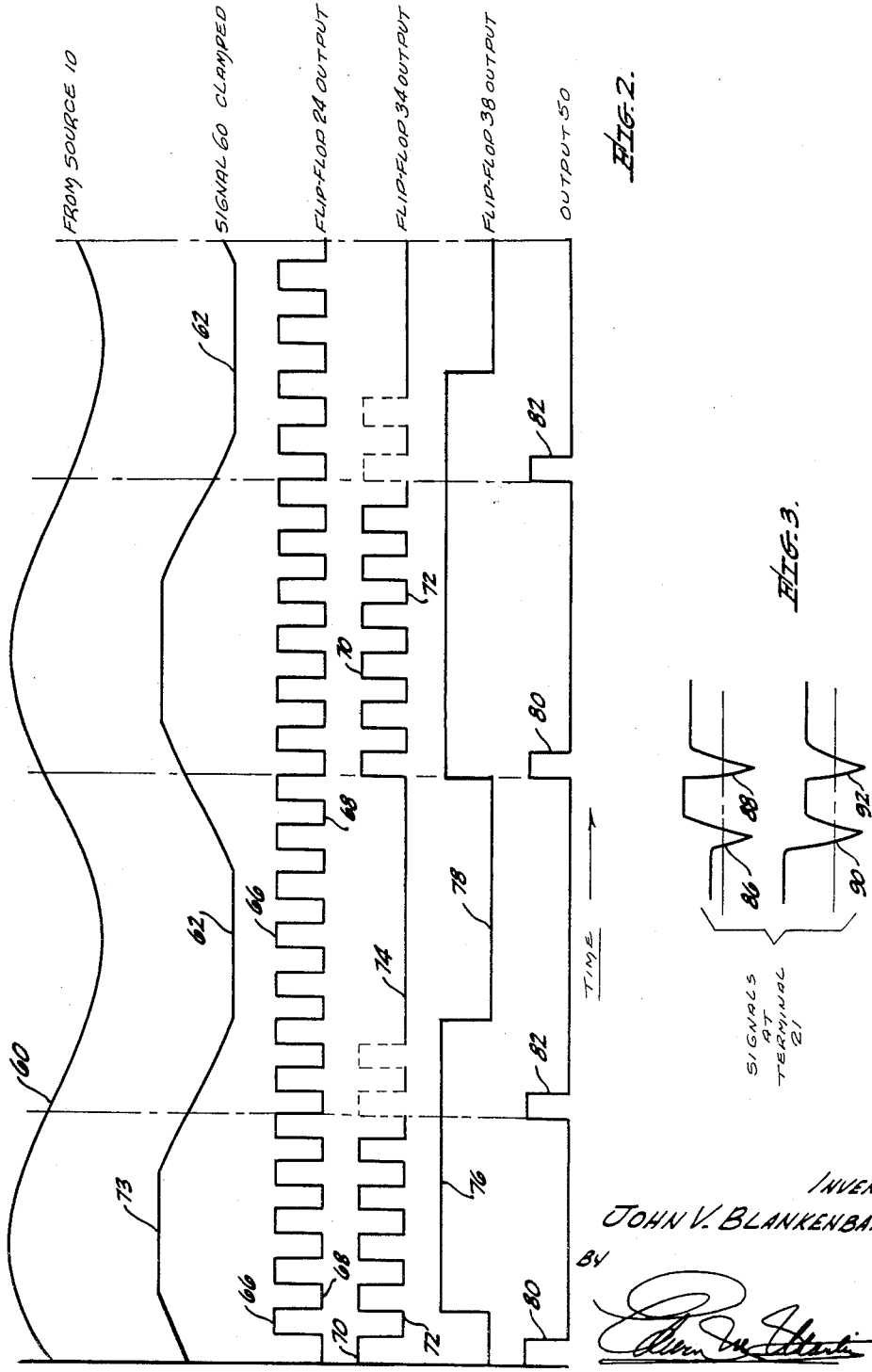

United States Patent Office 2,840,709
Patented June 24, 1958

2,840,709

FREQUENCY TO DIGITAL CONVERSION

John V. Blankenbaker, Inglewood, Calif., assignor to Hughes Aircraft Company, Culver City, Calif., a corporation of Delaware Application July 2, 1956, Serial No. 595,252

14 Claims. (Cl. 250—27)

This invention relates to a system for processing data and more particularly to a system for converting alternating signals into pulses representing the frequency of the signals. The invention is especially adapted to be used with alternating signals having frequencies variable at any instant over a considerable range of values.

Considerable advances have been made in recent years in the fields of digital computers and data processing systems. For example, digital computers have been built to solve a wide variety of mathematical problems which have previously not been capable of mental solution or which have been solved only after much mental effort. Data processing systems have been built to control inventories of large department stores and to control the operations of depositing and withdrawing money from banks. Data processing systems have also been built to control the movements of various machine tools such that the production of complex pieces can become largely automatic.

In one type of apparatus for controlling the movements of a machine tool, notches are formed at spaced intervals in a member to indicate unitary movements of the member. For example, the movement of the cutting member on the machine tool past each notch represents an integral unit of movement. A transducer such as a magnetic "read" head is movable with the cutting member to produce signals representing the units of movement. The notches may be provided with different magnetic properties than the raised portions between the notches so that the magnetic head can have signals induced in it in accordance with the movements of the cutting member.

In order to provide a proper control over the movements of the cutting member, pulses must be produced to indicate the movements of the cutting head past the various notches. Since the movements of the cutting member may vary in rate over a considerable range of values, it has been difficult until now to produce output signals representing each incremental unit of movement. This invention provides a system for producing pulses representing each incremental unit of movement even with considerable variations in the rate at which the cutting member is moving. The invention also has uses in any system in which the frequency of an alternating signal having variable time characteristics must be measured.

In the drawings:

Figure 1 is a circuit diagram somewhat in block form illustrating one embodiment of the invention;

Figure 2 shows a plurality of curves which illustrate the output voltages from certain of the members shown in Figure 1; and Figure 3 shows curves which illustrate on an amplified scale voltage wave forms produced at a particular terminal in Figure 1.

In the embodiment of the invention shown in Figure 1, a source 10 of alternating signals is provided. The alternating signals may have a constant frequency or may have a frequency variable at any instant over a considerable range of values. The alternating signals may be produced by a wide variety of means. For example, the alternating signals may be produced by a motor the speed of which can vary over a substantial range. The alternating signals may also be induced in a magnetic head disposed in magnetic proximity to a notched track. The magnetic head may be moved relative to the notched track in accordance with the movements of a cutting member which is being automatically driven to produce components such as cams having complex shapes.

The alternating signals from the source 10 are introduced to the cathode of a diode 12 having its plate connected to a source 14 of direct voltage so as to receive a negative voltage from the source. The negative voltage introduced to the plate of the diode 12 from the source 14 may be in the order of −15 volts. The source 14 may be any suitable power suply for providing a direct voltage. Preferably, the source 14 may be constructed to provide voltages having stabilized amplitudes.

The alternating signals from the source 10 are also introduced to the cathode of a diode 16, the plate of which has common connections with first terminals of resistances 18, 20 and 22. The common connection between the resistances 18, 20 and 22 and the plate of the diode 16 is indicated in Figure 1 as being made at a terminal 21. The second terminal of the resistance 18 is connected to the source 14 to receive a suitable positive voltage such as +100 volts from the source. The resistance 18 may be provided with a suitable value such as approximately 78,000 ohms. A connection is made from the second terminal of the resistance 20 to the plate of a diode 23 having its cathode connected to the left output terminal of a flip-flop 24. The diodes 16 and 23 and the resistance 20 form a circuit commonly designated as an "and" circuit. This "and" network may be similar to other "and" networks shown in block form in Figure 1.

The flip-flop 24 may be any suitable type of bistable member. Since various types of bistable members are known in the art, the flip-flop 24 and other flip-flops in Figure 1 are shown in block form. The flip-flop 24 is provided with two input terminals and two output terminals. The input terminals of the flip-flop 24 and of the other flip-flops in Figure 1 will be respectively designated as the left and right input terminals and are shown as being positioned in the lower left and right portions of the block representing the flip-flop. The output terminals of the flip-flop 24 and of the other flip-flops in Figure 1 are respectively designated as the left and right output terminals and are shown as being positioned in the upper left and right positions of the block representing the flip-flop. Special types of flip-flops such as those designated as "Manchester" flip-flops may also be used.

The left input terminal of the flip-flop 24 receives signals from an "and" network 26, the operation of which is controlled by signals from the right output terminal of the flip-flop 24 and by clock signals from a source 30. The clock signals from the source 30 preferably occur at periodic intervals and have a frequency greater than any of the frequencies which may be provided for the alternating signals from the source 10. For example, the clock signals from the source 30 may be obtained from a blocking oscillator or any other suitable type of oscillator. The clock signals may also be obtained from the clock channel of a magnetic drum such as has been normally included in various digital computers and data processing systems.

The clock signals from the source 30 are introduced to one terminal of an "and" network 32 as well as to one input terminal of the "and" network 26. The "and" network 32 also has signals applied to it from the left output terminal of the flip-flop 24. The output terminal of the "and" network 32 has a common connection with the right input terminal of the flip-flop 24 such that signals pass through the "and" network to trigger the flip-flop to the false state of operation.

In addition to being connected to the resistances 18, 20 and 22 and the plate of the diode 23, the terminal 21 is connected to the left input terminal of a flip-flop 34. The right input terminal of the flip-flop 34 has signals applied to it from the right output terminal of the flip-flop 24. The signals from the right output terminal of the flip-flop 24 also pass to an input terminal of an "and" network 36 having another input terminal connected to the left output terminal of the flip-flop 34. A connection is made from the output terminal of the "and" network 36 to the left input terminal of the flip-flop 38. In like manner, the right input terminal of the flip-flop 38 is connected to the output terminal of an "and" network 40, the input terminals of which receive signals from the right output terminals of the flip-flops 24 and 34.

Input terminals of an "and" network 42 are connected to the right output terminals of the flip-flops 24 and 38 and the left output terminal of the flip-flop 34. Similarly, connections are made to input terminals of an "and" network 44 from the left output terminal of the flip-flop 38 and the right output terminals of the flip-flops 24 and 34. The signals from the output terminals of the "and" networks 42 and 44 are respectively introduced to the plates of diodes 46 and 48. The cathodes of the diodes 46 and 48 are connected to an output line 50 and to one terminal of a resistance 52, the other terminal of which is adapted to receive a suitable voltage such as approximately −100 volts from the source 14. The resistance 52 may be provided with a suitable value such as approximately 55,000 ohms. The diodes 46 and 48 and the resistance 52 form a circuit commonly designated as an "or" network.

The source 10 is adapted to provide signals indicated at 60 in Figure 2. Although the signals 60 in Figure 2 are shown as being sinusoidal and at a constant frequency, the signals may have any wave shape and may be variable in frequency. During the negative swing of the alternating signals 60, the amplitude of the signals may become more negative than a particular value represented by the voltage introduced to the plate of the diode 12 from the source 14. When the amplitude of the signals 60 falls below the particular value, current flows through a circuit including the source 14, the diode 12 and the source 10. This causes the voltage at the cathode of the diode 12 to have the same value as the potential introduced to the plate of the diode from the source 14. In this way, the amplitude of the alternating signals from the source 10 cannot decrease below a particular negative value. This is indicated at 62 in Figure 2.

As previously described, the clock signals from the source 30 have a frequency higher than the frequency of the alternating signals from the source 10. The frequencies of the signals from the sources 10 and 30 may have an integral relationship or any other relationship which would not necessarily be an integral relationship. The clock signals from the source 30 are introduced to the "and" networks 26 and 32. The clock signals pass through the "and" network 26 when a relatively high voltage is produced on the right output terminal of the flip-flop 24. After passing through the "and" network 26, the clock signals are introduced to the left input terminal of the flip-flop 24 to trigger the flip-flop into the true state of operation. This is represented by a relatively high voltage on the left output terminal of the flip-flop 24 and a relatively low voltage on the right output terminal of the flip-flop. The relatively high voltages produced on the left output terminal of the flip-flop 24 are indicated at 66 in Figure 2.

Relatively high voltages are produced on the left output terminal of the flip-flop 24 in accordance with the logical equation:

$$t = \overline{T}C \qquad (1)$$

where:

$t =$ the introduction of a triggering signal to the left input terminal of the flip-flop 24;
$\overline{T} =$ a relatively high voltage on the right output terminal of the flip-flop 24; and
$C =$ clock signals from the source 30.

The relatively high voltage on the left output terminal of the flip-flop 24 is introduced to the "and" network 32 to prepare the "and" network for the passage of clock signals from the source 30. When the "and" network 32 becomes prepared for operation, the next clock signal from the source 30 passes through the "and" network to the right input terminal of the flip-flop 24. This signal triggers the flip-flop 24 to the false state of operation, as represented by a relatively high voltage on the right output terminal of the flip-flop 24 and a relatively low voltage on the left output terminal of the flip-flop. The relatively low voltages produced on the left output terminal of the flip-flop 24 are indicated at 68 in Figure 2.

The flop-flop 24 becomes triggered to its false state of operation in accordance with the following logical equation:

$$\bar{t} = TC \qquad (2)$$

where:

$\bar{t} =$ the introduction of a triggering signal to the right input terminal of the flip-flop 24;
$T =$ the production of a relatively high voltage on the left output terminal of the flip-flop 24; and
$C =$ a clock signal from the source 30.

Because of the relatively high voltage produced on the right output terminal of the flip-flop 24, the "and" network 26 becomes prepared to pass the next clock signal from the source 30. In this way, the flip-flop 24 becomes alternately triggered to its true and false states of operation upon the introduction of successive clock signals. This causes the voltages 66 of high amplitude and the voltages 68 of low amplitude to be alternately produced on the left output terminal of the flip-flop 24. The alternate signals of high and low amplitude on the left output terminal of the flip-flop 24 have a frequency one half as great as the frequency of the clock signals from the source 30.

The signals produced on the left output terminal of the flip-flop 24 are introduced to the cathode of the diode 23. When the voltage 66 of high amplitude is produced on the left output terminal of the flip-flop 24, this voltage prevents current from flowing through a circuit including the voltage source 14, the resistance 18, the resistance 20, the diode 23 and the flip-flop 24 or at least minimizes any flow of current through this circuit. During the time that a relatively high voltage is also introduced to the cathode of the diode 16 from the source 10, no current or at least a minimum current is able to flow through a circuit including the voltage source 14, the resistance 18, the diode 16 and the source 10. Because of this, a relatively high voltage approaching the potential from the source 14 is produced at the terminal 21 upon the simultaneous introduction of high voltages to the cathodes of the diodes 16 and 23.

A voltage approaching the potential of the source 14 is produced at the terminal 21 upon the simultaneous introduction of voltages of high amplitude to the cathodes of the diodes 16 and 23 even though the amplitude of the signals from the source 10 may rise above a particular value such as the potential from the source 14. This results from the fact that current is not able to flow through the diode 16 when the positive amplitude of the alternating signals 60 introduced to the cathode of the diode 16 is greater than the amplitude of the positive potential introduced to the plate of the diode. The action of the diode 16 in limiting the positive potential of the alternating signals is illustrated at 73 in Figure 2.

Upon the occurrence of the next clock signal from the source 30, a relatively low voltage is produced on the left output terminal of the flip-flop 24 as previously described. This low voltage is introduced to the cathode of the diode 23 to produce a flow of current through a circuit including the source 14, the resistance 18, the resistance 20, the diode 23 and the flip-flop 24. Because of voltage produced across the resistance 18 by the flow of current through the resistance, a voltage drop occurs at the terminal 21.

The drop in voltage at the terminal 21 is introduced to the left input terminal of the flip-flop 34 to trigger the flip-flop into the true state of operation, as represented by a relatively high voltage on the left output terminal of the flip-flop. The flip-flop 34 is triggered to its true state of operation in accordance with the following logical equation:

$$r = FT \qquad (3)$$

where:

$r=$ the introduction of a triggering signal to the left input terminal of the flip-flop 34;
$F=$ the introduction of a signal of positive amplitude from the source 10, this signal being clamped as indicated at 73 in Figure 2; and
$T=$ a signal of high amplitude from the left output terminal of the flip-flop 24.

In the next cycle of clock signals from the source 30, the flip-flop 24 becomes triggered to the false state of operation in accordance with the logic expressed in Equation 2. This causes a relatively high voltage to be introduced to the right input terminal of the flip-flop 34. At the end of this clock signal, the flip-flop 24 again becomes triggered to the true state such that the voltage on the right output terminal of the flip-flop changes from a high amplitude to a low amplitude.

The decrease in the amplitude of the voltage on the right output terminal of the flip-flop 24 causes a triggering signal to be introduced to the right input terminal of the flip-flop 34. This signal triggers the flip-flop 34 to the false state of operation, as represented by a relatively high voltage on the right output terminal of the flip-flop and a relatively low voltage on the left output terminal of the flip-flop. The flip-flop 34 becomes triggered to the false state of operation in accordance with the logical equation:

$$\bar{r} = \bar{T} \qquad (4)$$

where:

$\bar{r}=$ the introduction of a triggering signal to the right input terminal of the flip-flop 34; and
$\bar{T}=$ a relatively high voltage on the right output terminal of the flip-flop 24.

During the time that the alternating signals 60 have a positive polarity and an amplitude above a particular value, the flip-flop 34 becomes triggered to its true state in one clock cycle and triggered to its false state in the next clock cycle. This is in accordance with the logic expressed in Equations 3 and 4. In this way, signals 70 of high amplitude and signals 72 of low amplitude are alternately produced on the left output terminal of the flip-flop 34. The signals 70 and 72 and other signals produced by the flip-flop 34 may be considered as first control signals. The alternate production of the signals 70 and 72 continues until the amplitude of the alternating signals 60 decreases below the particular positive value. The flip-flop 34 then remains in its false state during the time that the negative half cycles of the alternating signals 60 are being presented. This is indicated at 74 in Figure 2.

The positive voltage produced on the left output terminal of the flip-flop 34 is introduced to the "and" network 36 to prepare the "and" network for operation. The "and" network 36 then passes a signal in the clock cycle in which a relatively high voltage simultaneously occurs on the right output terminal of the flip-flop 24. The signal passing through the "and" network 36 is introduced to the left input terminal of the flip-flop 38 to trigger the flip-flop to the true state of operation.

When the flip-flop 38 is triggered to the true state of operation, a relatively high voltage is produced on the left output terminal of the flip-flop, as indicated at 76 in Figure 2. Such a voltage is produced in accordance with the logical equation:

$$m = R\bar{T} \qquad (5)$$

where $m=$ the introduction of a triggering signal to the left input terminal of the flip-flop 38; and
$R=$ the production of a high voltage on the left output terminal of the flip-flop 34.

The voltages such as the voltage 76 produced on the output terminals of the flip-flop 38 may be considered second control signals.

It has been explained previously that each of the flip-flops 24, 34 and 38 becomes triggered from one state of operation to the other at the time that a negative signal is introduced to the flip-flop. Since the right input terminal of the flip-flop 38 is connected to the output terminal of the "and" network 40, the flip-flop 38 becomes triggered to its false state when a negative signal passes through the "and" network 40. This should occur at the time that the voltage on the right output terminal of the flip-flop 24 changes from a high amplitude to a low amplitude. However, a signal can pass through the "and" network 40 from the flip-flop 24 only during the time that a relatively high voltage is simultaneously produced on the right output terminal of the flip-flop 34.

Since the production of a high voltage on the right output terminal of the flip-flop 34 is also controlled by the signals from the right output terminal of the flip-flop 24, a signal is not able to pass through the "and" network 40 unless the flip-flop 34 has been previously triggered to its false state of operation. This cannot occur when the signals 70 and 72 are being alternately produced in the flip-flop 34 during the occurrence of successive clock cycles. In this way, the flip-flop 38 remains in its true state during the time that the signals 70 and 72 are alternately produced on the left output terminal of the flip-flop 34. In other words, the flip-flop 38 cannot become triggered to its false state unless the flip-flop 34 remains in its false state for at least two successive clock cycles.

When the flip-flop 34 remains in its false state of operation for at least two consecutive clock cycles, a relatively high voltage occurs on the right output terminal of the flip-flop 34 at the time that the voltage on the right output terminal on the flip-flop 24 is changing from a high amplitude to a low amplitude. This causes a signal to pass through the "and" network 40 to the right input terminal of the flip-flop 38. The signal triggers the flip-flop 38 to the false state of operation, as represented by a relatively high voltage on the right output terminal of the flip-flop and a relatively low voltage on the left output terminal of the flip-flop. The relatively low voltage on the left output terminal of the flip-flop 38 is indicated at 78 in Figure 2. The flip-flop 38 becomes triggered to the false state of operation in accordance with the logical equation:

$$\bar{m} = \bar{T}\bar{R} \qquad (6)$$

where $\bar{m}=$ the introduction of a triggering signal to the right input terminal of the flip-flop 38; and
$\bar{R}=$ the production of a high voltage on the right output terminal of the flip-flop 34.

The "and" network 42 is able to pass a signal only when relatively high voltages are simultaneously introduced to it from the left output terminal of the flip-flop 34 and the right output terminals of the flip-flops 24 and 38. As will be seen, this occurs only in the first of several successive triggerings of the flip-flop 34 to the true state of operation during alternate clock cycles. This results from the fact that the flip-flop 38 is in the false state of operation only during the first time that the flip-flop 34 is triggered to the true state and not during the successive times that the flip-flop 34 is triggered to the true state.

Since the signals passing through the "and" network 42 have a high amplitude, current flows through a circuit including the flip-flops 24, 34 and 48, the "and" network 42, the diode 46, the resistance 52 and the voltage source 14. This current produces a positive voltage across the resistance 52 and a rise in the voltage on the output line 50. The resultant pulse of voltage produced on the output line 50 is indicated at 80 in Figure 2. The pulses 80 are produced on the output line 50 in accordance with the logical equation:

$$z = \overline{T M R} \quad (7)$$

where:

$z=$ an output signal on the line 50;

$\overline{M}=$ a relatively high voltage on the right output terminal of the flip-flop 38; and the other terms have previously been defined.

Signals also pass through the "and" network 44 when relatively high voltages are simultaneously produced on the left output terminal of the flip-flop 38 and on the right output terminals of the flip-flops 24 and 34. This occurs only in the first cycle in which the flip-flop 70 is not triggered to its true state after it has been previously triggered to the false state. The signals are able to pass through the "and" network 44 only at such times since these are the only times that a relatively high voltage still remains on the left output terminal of the flip-flop 38.

The signals passing through the "and" network 44 produce a flow of current through the diode 48 and the resistance 52 such that pulses of positive amplitude are produced on the output line 50. The pulses of positive amplitude produced on the output line 50 by the passage of signals through the "and" network 44 are indicated at 82 in Figure 2. The pulses 82 are produced on the output line 50 in accordance with the logical equation:

$$z = \overline{T R M} \quad (8)$$

where:

$M=$ a relatively high voltage on the left output terminal of the flip-flop 38; and the other terms have previously been defined.

It will be noticed that each of the pulses 80 and 82 has a duration corresponding to the duration of one of the clock signals from the source 30. The pulses 80 are produced during the positive half cycles of the alternating signals 60. Similarly, the pulses 82 are produced in the negative half cycles of the alternating signals 60 or at least at a time approaching the beginning of the negative half cycles in the alternating signals 60. By introducing the pulses 80 and 82 to separate output terminals, a distinction can be obtained between the positive and negative half cycles of the alternating signals. If it should be desired only to indicate the occurrence of successive cycles of the alternating signals 60, both of the pulses 80 and 82 can be included as one alternative. This alternative is shown in Figure 1 and is illustrated in Figure 2. As another alternative, either the pulses 80 or the pulses 82 can be used to indicate the occurrence of successive cycles in the alternating signals 60.

At some time during the rise in amplitude of the alternating signals 60, the flip-flop 34 is first triggered to the true state of operation in accordance with the logic expressed in Equation 3. After two more cycles of clock signals, the flip-flop 38 becomes triggered to its true state of operation in accordance with the logic expressed in Equation 5. This may also be seen from the curves shown in Figure 2.

When the flip-flop 38 becomes triggered to the true state of operation, a relatively high voltage is introduced from the left output terminal of the flip-flop 38 through the resistance 22 to the terminal 21. The output voltage fed back from the flip-flop 38 to the terminal 21 helps in maintaining the terminal at a high amplitude. In this way, a negative triggering signal having a large amplitude is produced at the terminal 21 when the voltage on the left output terminal of the flip-flop 24 changes from a high amplitude to a low amplitude. This may be seen by a comparison in the amplitudes of two successive triggering signals 86 and 88 produced at the terminal 21. The signal 86 is produced during the time that the flip-flop 38 is still in its false state of operation and the signal 88 is produced during the time that the flip-flop 38 is in its true state of operation. The signal 88 has a greater amplitude than the signal 86 since it starts from a higher positive amplitude than the signal 86.

In this way, the flip-flop 38 operates to facilitate the triggering of the flip-flop 34 to the true state of operation upon the occurrence of alternate clock signals during the time that the alternating signals 60 have a positive amplitude above a particular value. As previously described in connection with the logic expressed in Equations 7 and 8, this is important in insuring that only the output pulses 80 are produced during the positive half cycles of the alternating signals.

It has been previously described that the flip-flop 38 is triggered to its false state of operation when the amplitude of the alternating signals 60 falls below a particular positive value. The triggering of the flip-flop 38 to its false state of operation is indicated at 78 in Figure 2. When the flip-flop 38 is triggered to its false state of operation, a relatively low voltage is introduced from the left output terminal of the flip-flop through the resistance 22 to the terminal 21. This low voltage causes the magnitude of the positive voltage at the terminal 21 to decrease even though a constant voltage is introduced to the terminal from the source 14. Because of the decrease in the magnitude of the voltage at the terminal 21, a decrease is obtained in the amplitude of the negative signals produced at the terminal when the voltage on the left output terminal of the flip-flop 24 changes from a high amplitude to a low amplitude.

The decrease in the amplitude of the negative signals at the terminal 21 may be seen from a comparison of signals 90 and 92 in Figure 3. The signals 90 are produced during the time that the flip-flop 38 is in its true state and the signals 92 are produced during the time that the flip-flop 38 is in its false state. By decreasing the amplitude of the signals in the terminal 21 from that illustrated by the signals 90 to that illustrated by the signals 92, the amplitude of the negative signals become too low to trigger the flip-flop 34 to the true state of operation. This is desirable since the flip-flop 34 should remain in its false state of operation during the time that the amplitude of the alternating signals are below the particular positive value. This is indicated at 74 in Figure 2.

It should be appreciated that the alternating signals 60 may be produced by physical movements of a transducer. For example, a cutting member and a transducer such as a magnetic "read" head may be included in data processing apparatus for automatically controlling the movements of the cutting member to produce components such as cams having complex shapes. The magnetic "read" head may be moved in synchronization with the cutting member past a track having notches and raised portions alternately disposed relative to one another.

Upon the movements of the magnetic "read" head past the notches and raised portions, signals corresponding to the alternating signals 60 are induced in the head. These signals have at any instant a frequency dependent upon the rate of movement of the magnetic head past the notches and raised portions. One type of magnetic "read" head capable of being used in such apparatus is disclosed in detail and claimed in co-pending application Serial No. 588,711 filed June 1, 1956 by David F. Brower, and assigned to the same assignee as this application.

It will be seen from the above discussion that the system constituting this invention can be used in any apparatus where the frequency of alternating signals must be measured. The system is especially adapted to be used in apparatus where the frequency of the alternating signals may vary over considerable ranges and where the frequency of the alternating signals may fall to relatively low values.

I claim:

1. Apparatus for converting alternating signals into pulses indicating the frequency of the signals, including, means for providing clock signals having a frequency higher than the frequency of the alternating signals, means for sampling the amplitude of the alternating signals at periodic intervals related to the frequency of the clock signals to produce first control signals at a frequency dependent upon the frequency of the clock signals during at least a first polarity in the alternating signals, means for sampling the first control signals in accordance with the frequency of the clock signals to produce second control signals having an amplitude dependent upon the regularity of the first control signals, and means for operating upon the first and second control signals and the clock signals in a particular manner to obtain output pulses at a frequency related to the frequency of the alternating signals.

2. Apparatus for converting alternating signals into pulses indicating the frequency of the signals, including, means for providing clock signals having a frequency higher than the frequency of the alternating signals, means including a first bistable member operative upon the alternating signals and the clock signals for providing first control signals having changes in characteristics at a frequency related to the frequency of the clock signals during at least one polarity of the alternating signals, means including a second bistable member operative upon the first control signals and the clock signals for providing second control signals having an amplitude continued until the interruption in the regularity of the first control signals, and means including at least one "and" network for operating upon the first and second control signals and the clock signals to produce pulses having a frequency representing the frequency of the alternating signals.

3. Apparatus for converting alternating signals into pulses indicating the frequency of the signals, including, means for providing clock signals at a frequency higher than the frequency of the alternating signals, a first bistable member having first and second states of operation, means including the first bistable member for triggering the member to the first and second states of operation at a rate dependent upon the frequency of the clock signals during at least a portion of each alternating signal, a second bistable member having first and second states of operation, means for combining the signals from the clock signal means and the first bistable member to trigger the second bistable member in accordance with the operation of the first bistable member and after a delay dependent upon the regularity in the triggering of the first bistable member to the first and second states of operation, and means for combining the signals from the clock signal means and from the first and second bistable members to produce output pulses having a rate indicating the frequency of the alternating signals.

4. Apparatus for converting alternating signals into pulses indicating the frequency of the signals, including, means for providing clock signals at a frequency higher than the frequency of the alternating signals, first electrical circuitry for providing first and second control signals representing the opposite polarities of the alternating signals and for presenting the signals on an alternate basis at a rate related to the frequency of the clock signals during at least a portion of each cycle of alternating voltage, second electrical circuitry responsive to the signals from the clock means and from the first electrical circuitry for providing third and fourth control signals having rise times delayed from particular ones of the first and second control signals by times related to the frequency of the clock signals and having durations dependent upon the periodicity of the first and second control signals, and electrical circuitry responsive to the signals from the clock means and from the first and second electrical circuitry for producing output pulses having a frequency corresponding to the frequency of the alternating signals.

5. Apparatus for converting alternating signals into pulses indicating the frequency of the signals, including, means for providing clock signals at a frequency higher than the frequency of the alternating signals, means for operating on the alternating signals and the clock signals to provide first control signals having amplitudes alternating between first and second levels during a first polarity in the alternating signals and having the second level during the opposite polarity in the alternating signals, means for operating on the first control signals and the clock signals to produce second control signals having a first amplitude during the alternation of the first control signals between the first and second amplitudes and having a second amplitude during the production of the second level in the first control signals, and means for combining the first and second control signals and the clock signals to produce output pulses at a rate corresponding to the frequency of the alternating signals.

6. Apparatus for converting alternating signals into pulses indicating the frequency of the signals, including, means for providing clock signals at a frequency higher than the frequency of the alternating signals, means including at least a first "and" network for operating upon the alternating signals and the clock signals to produce first control signals having amplitudes alternating between first and second levels in successive clock cycles during particular characteristics in the alternating signals and having the second characteristics at the other times in the alternating signals and during the occurrence of successive clock signals, means including at least a second "and" network for operating upon the first control signals and the clock signals to produce second control signals having a first amplitude upon the alternation in the amplitude of the first control signals and having a second amplitude upon the occurrence of the first control signals having the second characteristics in the successive clock cycles, and means including at least a third "and" network for operating upon the first and second control signals and the clock signals to produce pulses having a rate representing the frequency of the alternating signals.

7. Apparatus for converting alternating signals into pulses indicating the frequency of the signals, including, means for providing clock signals at a frequency higher than the frequency of the alternating signals, means including at least a first "and" network and a first bistable member for operating upon the alternating signals and the clock signals to produce in the bistable member control signals having first and second amplitudes during successive clock signals upon the occurrence in the alternating signals of amplitudes differing in a first respect from a particular value and having the second amplitude during successive clock cycles upon the occurrence in the alternating signals of amplitudes differing in a second respect opposite to the first respect from the particular value, means including at least a second "and" network and a second bistable member for operating upon the first control signals and the clock signals to produce in the bistable member second control signals having a first amplitude a particular number of clock cycles after the initiation in the production of the alternating characteristics in the amplitudes of the first control signals and having a second amplitude a particular number of clock cycles after the initiation in the production of the second amplitude in the first control signals during successive clock cycles, and means including at least a third "and" network for operating upon the first and second control signals and the clock signals to produce output pulses having a rate corresponding to the frequency of the alternating signals.

8. Apparatus for converting alternating signals into pulses indicating the frequency of the signals, including, means for providing clock signals at a frequency higher than the frequency of the alternating signals, a first bistable member having first and second states of operation, means including at least a first "and" network for combining the alternating signals and first alternate clock signals to trigger the first bistable member into the first state of operation in the first alternate clock cycles during the occurrence of first characteristics in the alternating signals, means for introducing second alternate clock signals to the first bistable member to trigger the first bistable member into the second state of operation in the second alternate clock cycles during the occurrence of the first characteristics in the alternating signals and to maintain the bistable member in the second state of operation at the other times in the alternating signals, a second bistable member having first and second states of operation, means including at least a second "and" network for combining the signals from the first bistable member and the second alternate clock signals to trigger the second bistable member to the first state of operation upon the simultaneous occurrence of the first state of operation in the first bistable member and the second alternate clock signals and to maintain the second bistable member in the first state of operation during the alternation of the first bistable member between the first and second states of operation in alternate clock cycles, means including at least a third "and" network for combining the signals from the first bistable member and the second alternate clock signals to trigger the second bistable member to the second state of operation upon the simultaneous occurrence of the second state of operation in the first bistable member and the second alternate clock signals, and means including at least a fourth "and" network for combining the signals from the first and second bistable members and the clock signals to produce output pulses having a frequency corresponding to the frequency of the alternating signals and having a duration corresponding to the frequency of the clock signals.

9. Apparatus for converting alternating signals into pulses indicating the frequency of the signals, including, means for providing clock signals having a frequency higher than the frequency of the alternating signals, means for sampling the amplitude of the alternating signals at periodic intervals related to the frequency of the clock signals to produce first control signals having characteristics alternating at a frequency dependent upon the frequency of the clock signals and for producing the alternating characteristics in the first control signals during at least a first polarity in the alternating signals, means for sampling the first control signals in accordance with the frequency of the clock signals to produce second control signals having first characteristics during the production of the alternating characteristics in the first control signals and having second characteristics at the other times in the alternating signals, means for providing for a feedback of the second control signals to the first control means to facilitate the production of the alternating characteristics in the first control signals during the first polarity in the alternating signals and to retard the production of the alternating characteristics in the first control signals during a second polarity in the alternating signals, and means for operating upon the first and second control signals and the output signals in a particular relationship to obtain output pulses at a frequency related to the frequency of the alternating signals.

10. Apparatus for converting alternating signals into pulses indicating the frequency of the signals, including, means for providing clock signals at a frequency higher than the frequency of the alternating signals, means including at least a first "and" network and a first bistable member for operating on the alternating signals and the clock signals to provide first control signals having amplitudes alternating between first and second levels during the occurrence of first characteristics in the alternating signals and having the second level of amplitude during the occurrence of second characteristics in the alternating signals, means including at least a second "and" network and a second bistable member for operating on the first control signals and the clock signals to provide second control signals having a first amplitude during the alternation of the first control signals between the first and second amplitudes and having a second amplitude during the production of the second level of amplitude in the first control signals during successive half cycles, means for providing a feedback between the second bistable member and the first "and" network to facilitate the production of the alternations in the first control signals during the first characteristics in the alternating signals and to retard the production of the alternations in the first control signals during the second characteristics in the alternating signals, and means for combining the first and second control signals and the clock signals to produce output pulses at a rate representing the frequency of the alternating signals.

11. Apparatus for converting alternating signals into pulses indicating the frequency and the polarity of the signals, including, means for providing clock signals at a frequency higher than the frequency of the alternating signals, first means for operating upon the alternating signals and the clock signals to produce first control signals having alternating characteristics during the occurrence of first characteristics in the alternating signals and having stable characteristics during the occurrence in the alternating signals of second characteristics different from the first characteristics, second means for operating upon the first control signals and the clock signals to produce second control signals having first characteristics upon the occurrence of the alternating characteristics in the first control signals and having second characteristics upon the occurrence of the stable characteristics in the first control signals, first output means for operating upon the first and second control signals and the clock signals in a first particular relationship to produce first output signals which have a rate respresenting the frequency of the alternating signals and which occur upon a change in the alternating signals to the first characteristics, and second output means for operating upon the first and second control signals and the clock signals in a second particular relationship to produce second output signals which have a rate representing the frequency of the alternating signals and which occur upon a change in the alternating signals to the second characteristics.

12. Apparatus for converting alternating signals into pulses indicating the frequency and the polarity of the signals, including, means for providing clock signals having a frequency higher than the frequency of the alternating signals, means including at least one "and" network for sampling the amplitude of the alternating signals at periodic intervals related to the frequency of the clock signals to produce first control signals having alternating characteristics at a frequency related to the frequency of the clock signals during the occurrence of first characteristics in the alternating signals, means including at least one "and" network for sampling the first control signals in accordance with the frequency of the clock signals to produce second control signals having first characteristics upon the occurrence of alternating characteristics in the first control signals and having second characteristics upon the occurrence in the alternating signals of second characteristics different from the first characteristics, means including an "and" network for operating upon the first and second control signals and the clock signals in a first particular relationship to produce first output signals at a rate corresponding to the frequency of the alternating signals and representing the first characteristics in the alternating signals, and means including an "and" network for operating upon the first and second control signals and the clock signals in a second particular relationship to produce second output signals at a rate corresponding to the frequency of the alternating signals and representing the second charactertistics in the alternating signals.

13. Apparatus for converting alternating signals into pulses indicating the frequency and the polarity of the signals, including, means for providing clock signals having a frequency higher than the frequency of the alternating signals, electrical circuitry for sampling the amplitude of the alternating signals at periodic intervals related to the frequency of the clock signals to produce first control signals having characteristics alternating at a frequency dependent upon the frequency of the clock signals during at least a first polarity of the alternating signals and having stable characteristics during the remaining portion of the alternating signals, electrical circuitry operative upon the first control signals and the clock signals for providing second control signals having first or second characteristics dependent upon the production of alternating or stable characteristics in the first control signals, electrical circuitry operative upon the first and second control signals and the clock signals in a first relationship to produce first output signals in successive cycles of the alternating signals and during the first polarity of the alternating signals to represent the frequency and polarity of the alternating signals, and electrical circuitry operative upon the first and second control signals and the clock signals in a second relationship to produce second output signals in successive cycles of the alternating signals and during the second polarity of the alternating signals to represent the frequency and polarity of the alternating signals.

14. Apparatus as set forth in claim 7, including, means for providing a feedback from the second bistable member to the first "and" network for facilitating the production of the alternations in the amplitudes of the first control signals during the occurrence in the alternating signals of amplitudes differing in the first respect from the particular value and for facilitating the maintenance of the second amplitude in the first control signals during the occurrence in the alternating signals of amplitudes differing in the second respect from the particular value, the third "and" network being connected to produce output pulses only upon a first polarity in the alternating signals, and means including a fourth "and" network for operating upon the first and second control signals and the clock signals to produce output pulses having a rate corresponding to the frequency of the alternating signals and only upon a second polarity in the alternating signals.

References Cited in the file of this patent

UNITED STATES PATENTS

| | | |
|---|---|---|
| 2,743,419 | Chatterton et al. | Apr. 24, 1956 |
| 2,769,595 | Bagley | Nov. 6, 1956 |